US007720605B2

(12) United States Patent
Welty et al.

(10) Patent No.: US 7,720,605 B2
(45) Date of Patent: May 18, 2010

(54) IDENTIFYING VEGETATION ATTRIBUTES FROM LIDAR DATA

(75) Inventors: Jeffrey J Welty, Tacoma, WA (US); Earl T Birdsall, Federal Way, WA (US); Robert K McKinney, Lake Tapps, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 348 days.

(21) Appl. No.: 11/767,084

(22) Filed: Jun. 22, 2007

(65) Prior Publication Data

US 2008/0319668 A1 Dec. 25, 2008

(51) Int. Cl.
*G01V 3/38* (2006.01)
(52) U.S. Cl. .................................................. 702/2
(58) Field of Classification Search .................... 702/2, 702/5, 143, 144, 146, 156, 166, 170, 172, 702/189, 193; 356/5.01, 501; 342/268; 33/1 A
See application file for complete search history.

(56) References Cited

U.S. PATENT DOCUMENTS

| 6,792,684 | B1 * | 9/2004 | Hyyppa | ........................ 33/1 A |
| 7,046,841 | B1 | 5/2006 | Dow et al. | |
| 7,187,452 | B2 * | 3/2007 | Jupp et al. | .................. 356/501 |
| 2004/0130702 | A1 | 7/2004 | Jupp et al. | |

OTHER PUBLICATIONS

Wack R et al., "Forest inventory for eucalyptus plantations based on airborne laserscanner data," *Proceedings of International Society for Photogrammetry and Remote Sensing Symposium*, The Netherlands, Jul. 2000, International Archives of Photogrammetry and Remote Sensing, 8 p.

Wulder et al; "Local Maxium Filtering for the Extraction of Tree Locations and Basal Area from High Spatial Resolution Imagery" Remote Sens. Environ. vol. 73, 2000, pp. 103-114, XP002496270 New York p. 106, col. 2-p. 107, col. 2.

Juha Hyyppa et al: "A Segmentation-Based Method to Retrieve Stem Volume Estimates from 3-D Tree Height Models Produced by Laser Scanners" IEEE Transactions on Geosceience and Remote Sensing, IEEE Service Center, Piscataway, NJ, US, vole. 39, No. 5, May 1, 2001.

Hyyppa J: "Feasibility for estimation of single tree characteristics using laser scanner" Geoscience and Remote Sensing Symposium, 2000. Proceedings. IGARS 2000. IEEE 200 International Jul. 24-28, 2000, Piscataway, NJ, US, IEEE, vol. 3, Jul. 24, 2000, pp. 981-983, XP010502852 ISBN: 978-0-7803-6359-5.

Gougeon Fa et al: "Individual Tree Crown Image Analysis—A Step Towards Precision Forestry" International Precision Forestry Symposium, XX, XX, Jun. 17, 2001, pp. 1-12, XP0088063676 p. 2, paragraph 5.

\* cited by examiner

*Primary Examiner*—Mohamed Charioui
(74) *Attorney, Agent, or Firm*—Christensen O'Connor Johnson Kindness PLLC

(57) ABSTRACT

Aspects of the present invention are directed at using LiDAR data to identify attributes of vegetation. In this regard, a method is provided that identifies the location of individual items of vegetation from raw LiDAR data. In one embodiment, the method includes selecting a coordinate position represented in the LiDAR data that generated a return signal. Then, a determination is made regarding whether the selected coordinate position is inside a geographic area allocated to a previously identified item of vegetation. If the selected coordinate position is not within a geographic area allocated to a previously identified item of vegetation, the method determines that the selected coordinate position is associated with a new item of vegetation. In this instance, a digital representation of the new item of vegetation is generated.

18 Claims, 7 Drawing Sheets

| | RETURN NUMBER | LOCATION | INTENSITY | GROUND FLAG |
|---|---|---|---|---|
| 302 | 1 | X, Y, Z | .11 | FALSE |
| | 2 | X, Y, Z | .09 | FALSE |
| | 3 | X, Y, Z | .21 | TRUE |
| 304 | 1 | X, Y, Z | .08 | FALSE |
| | 2 | X, Y, Z | .09 | TRUE |
| 306 | 1 | X, Y, Z | .11 | FALSE |
| | 2 | X, Y, Z | .08 | FALSE |
| | 3 | X, Y, Z | .02 | FALSE |
| | 4 | X, Y, Z | .14 | TRUE |

*Fig.3.*

| | IDENTIFIER | LOCATION | HEIGHT | HTLC | DBH |
|---|---|---|---|---|---|
| 502 | 1 | X, Y, Z | 13.3M | 4.1M | .42M |
| 504 | 2 | X, Y, Z | 14.2M | 6.3M | .51M |
| 506 | 3 | X, Y, Z | 6.8M | 2.1M | .28M |
| 508 | 4 | X, Y, Z | 17.8M | 13.1M | .36M |

*Fig. 5.*

IDENTIFYING VEGETATION ATTRIBUTES FROM LIDAR DATA

BACKGROUND

A long-standing need exists for biologists, forest managers, and others to have information that characterizes a set of vegetation, such as a stand of trees. Traditionally, attributes of a sample of the vegetation are manually obtained and extrapolated to a larger set of vegetation. For example, sampling may be performed to assess the vegetation's height, volume, age, biomass, and species, among other attributes. This information that characterizes the attributes of the vegetation may be used in a number of different ways. For example, the sample data may be used to quantify the inventory of raw materials that are available for harvest. By way of another example, by comparing attributes of a sample set of vegetation over time, one may determine whether a disease is compromising the health of the vegetation.

Unfortunately, extrapolating sample data to a larger set may not accurately reflect the actual attributes of the vegetation. In this regard, the species and other vegetation attributes may depend on a number of different factors that are highly variable even in nearby geographic locations. As a result, biologists, forest managers, and others may not have information that accurately characterizes the attributes of vegetation.

Advancements in airborne and satellite laser scanning technology provide an opportunity to obtain more accurate information about the attributes of vegetation. In this regard, Light Detection and Ranging ("LiDAR") is an optical remote scanning technology used to identify distances to remote targets. For example, a laser pulse may be transmitted from a source location, such as an aircraft or satellite, to a target location on the ground. The distance to the target location may be quantified by measuring the time delay between transmission of the pulse and receipt of one or more reflected return signals. Moreover, the intensity of a reflected return signal may provide information about the attributes of the target. In this regard, a target on the ground will reflect return signals in response to a laser pulse with varying amounts of intensity. For example, a species of vegetation with a high number of leaves will, on average, reflect return signals with higher intensities than vegetation with a smaller number of leaves.

LiDAR optical remote scanning technology has attributes that make it well-suited for identifying the attributes of vegetation. For example, the wavelengths of a LiDAR laser pulse are typically produced in the ultraviolet, visible, or near infrared areas of the electromagnetic spectrum. These short wavelengths are very accurate in identifying the horizontal and vertical location of leaves, branches, etc. Also, LiDAR offers the ability to perform high sampling intensity, extensive aerial coverage, as well as the ability to penetrate the top layer of a vegetation canopy. In this regard, a single LiDAR pulse transmitted to target vegetation will typically produce a plurality of return signals that each provide information about attributes of the vegetation.

A drawback of existing systems is an inability to identify the location of individual trees, bushes, and other vegetation that is scanned using LiDAR instrumentation. For example, raw LiDAR data may be collected in which a forest is scanned at a high sampling intensity sufficient to produce data that describes the position and reflective attributes of individual items of vegetation. It would be beneficial to have a system in which the raw LiDAR data is processed in order to identify the location of the individual items of vegetation.

It would also be beneficial to have a system capable of identifying various attributes of vegetation from raw LiDAR data. For example, with a high enough sampling rate, the shape and other properties of a tree's crown, branches, and leaves may be discernible. If this type of information was discernable, computer systems may be able to identify the species of individual items of vegetation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at using LiDAR data to identify attributes of vegetation. In this regard, a method is provided that identifies the location of individual items of vegetation from raw LiDAR data. In one embodiment, the method includes selecting a coordinate position represented in the LiDAR data that generated a return signal. Then, a determination is made regarding whether the selected coordinate position is inside a geographic area allocated to a previously identified item of vegetation. If the selected coordinate position is not within a geographic area allocated to a previously identified item of vegetation, the method determines that the selected coordinate position is associated with a new item of vegetation. In this instance, a digital representation of the new item of vegetation is generated.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 depicts a sample set of LiDAR data that may be used to illustrate aspects of the present invention;

FIG. 5 depicts a sample tree list data file with information describing the attributes of vegetation that is scanned with LiDAR instrumentation;

DETAILED DESCRIPTION

Figure 1:
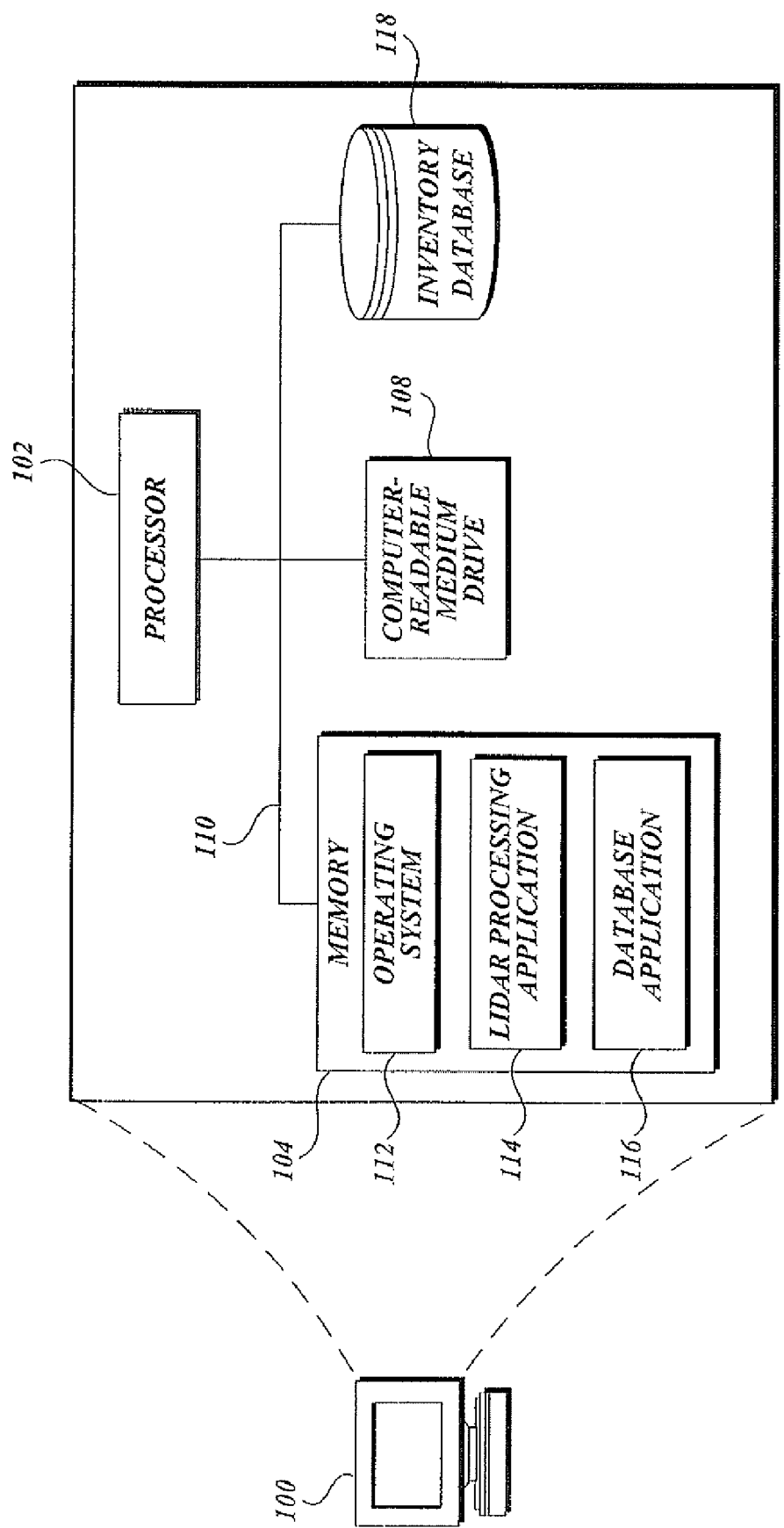
FIG. 1 depicts components of a computer that may be used to implement aspects of the present invention.

The present invention may be described in the context of computer-executable instructions, such as program modules being executed by a computer. Generally described, program modules include routines, programs, applications, widgets, objects, components, data structures, and the like, that perform tasks or implement particular abstract data types. Moreover, the present invention may also be practiced in distributed computing environments where tasks are performed by remote processing devices that are linked through a communication network. In a distributed computing environment, program modules may be located on local and/or remote computing storage media.

While the present invention will primarily be described in the context of using raw LiDAR data to identify the attributes of vegetation, those skilled in the relevant art and others will recognize that the present invention is also applicable in other contexts. For example, aspects of the present invention may be implemented using other types of scanning systems to identify the attributes of vegetation. In any event, the following description first provides a general overview of a computer system in which aspects of the present invention may be implemented. Then, methods for identifying the location and species of individual items of vegetation will be described. The illustrative examples provided herein are not intended to be exhaustive or to limit the invention to the precise forms disclosed. Similarly, any steps described herein may be interchangeable with other steps, or a combination of steps, in order to achieve the same result.

Now with reference to FIG. 1, an exemplary computer 100 with components that are capable of implementing aspects of the present invention will be described. Those skilled in the art and others will recognize that the computer 100 may be any one of a variety of devices including, but not limited to, personal computing devices, server-based computing devices, mini and mainframe computers, laptops, or other electronic devices having some type of memory. For ease of illustration and because it is not important for an understanding of the present invention, FIG. 1 does not show the typical components of many computers, such as a keyboard, a mouse, a printer, a display, etc. However, the computer 100 depicted in FIG. 1 includes a processor 102, a memory 104, a computer-readable medium drive 108 (e.g., disk drive, a hard drive, CD-ROM/DVD-ROM, etc.), that are all communicatively connected to each other by a communication bus 110. The memory 104 generally comprises Random Access Memory ("RAM"), Read-Only Memory ("ROM"), flash memory, and the like.

As illustrated in FIG. 1, the memory 104 stores an operating system 112 for controlling the general operation of the computer 100. The operating system 112 may be a general purpose operating system, such as a Microsoft® operating system, a Linux operating system, or a UNIX® operating system. Alternatively, the operating system 112 may be a special purpose operating system designed for non-generic hardware. In any event, those skilled in the art and others will recognize that the operating system 112 controls the operation of the computer by, among other things, managing access to the hardware resources and input devices. For example, the operating system 112 performs functions that allow a program to read data from the computer-readable media drive 108. As described in further detail below, raw LiDAR data may be made available to the computer 100 from the computer-readable media drive 108. In this regard, a program installed on the computer 100 may interact with the operating system 112 to access LiDAR data from the computer-readable media drive 108.

As further depicted in FIG. 1, the memory 104 additionally stores program code and data that provides a LiDAR processing application 114. In one embodiment, the LiDAR processing application 114 comprises computer-executable instructions that, when executed by the processor 102, applies an algorithm to a set of raw LiDAR data to identify the location of individual items of vegetation scanned using LiDAR instrumentation. As mentioned previously, LiDAR is an optical remote scanning technology that may be used to identify distances to remote targets. In this regard, a series of laser pulses may be transmitted from an aircraft, satellite, or other source location to target locations on the ground. The distance to vegetation impacted with the laser pulse (leaves, branches, etc.) is determined by measuring the time delay between transmission of the laser pulse and receipt of a return signal. Moreover, the intensity of the return signal varies depending on attributes of the vegetation that is contacted. In one embodiment, the LiDAR processing application 114 uses distance and intensity values represented in the raw LiDAR data to identify the location of individual items of vegetation (e.g., trees, plants, etc.) from which the raw LiDAR data was collected. In this regard, an exemplary embodiment of a routine implemented by the LiDAR processing application 114 that identifies the location of individual items of vegetation is described below with reference to FIG. 2.

In another embodiment, the LiDAR processing application 114 comprises computer-executable instructions that, when executed, by the processor 102, applies an algorithm that identifies the species of an individual item of vegetation. More specifically, the LiDAR processing application 114 implements functionality that identifies attributes of an individual item of vegetation including, but not limited to, height, crown parameters, branching patterns, among others. When a distinguishing attribute of the vegetation is known, processing is performed to identify the species of the vegetation. In this regard, an exemplary embodiment of a routine implemented by the LiDAR processing application 114 that is configured to identify species information from LiDAR data is described below with reference to FIG. 6.

As further depicted in FIG. 1, the memory 104 additionally stores program code and data that provides a database application 116. As mentioned previously, the LiDAR processing application 114 may identify certain vegetation attributes from LiDAR data. In accordance with one embodiment, the database application 116 is configured to store information that describes these vegetation attributes identified by the LiDAR processing application 114 in the inventory database 118. In this regard, the database application 116 may generate queries for the purpose of interacting with the inventory database 118. Accordingly, the inventory database 118 may be populated with a large collection of data that describes the attributes of vegetation from which LiDAR data was collected.

FIG. 1 depicts an exemplary architecture for the computer 100 with components that may be used to implement one or more embodiments of the present invention. Of course, those skilled in the art and others will appreciate that the computer 100 may include fewer or more components than those shown in FIG. 1. Moreover, those skilled in the art and others will recognize that while a specific computer configuration and examples have been described above with reference to FIG. 1, the specific examples should be construed as illustrative in nature as aspects of the present invention may be implemented in other contexts without departing from the scope of the claimed subject matter.

Figure 2:
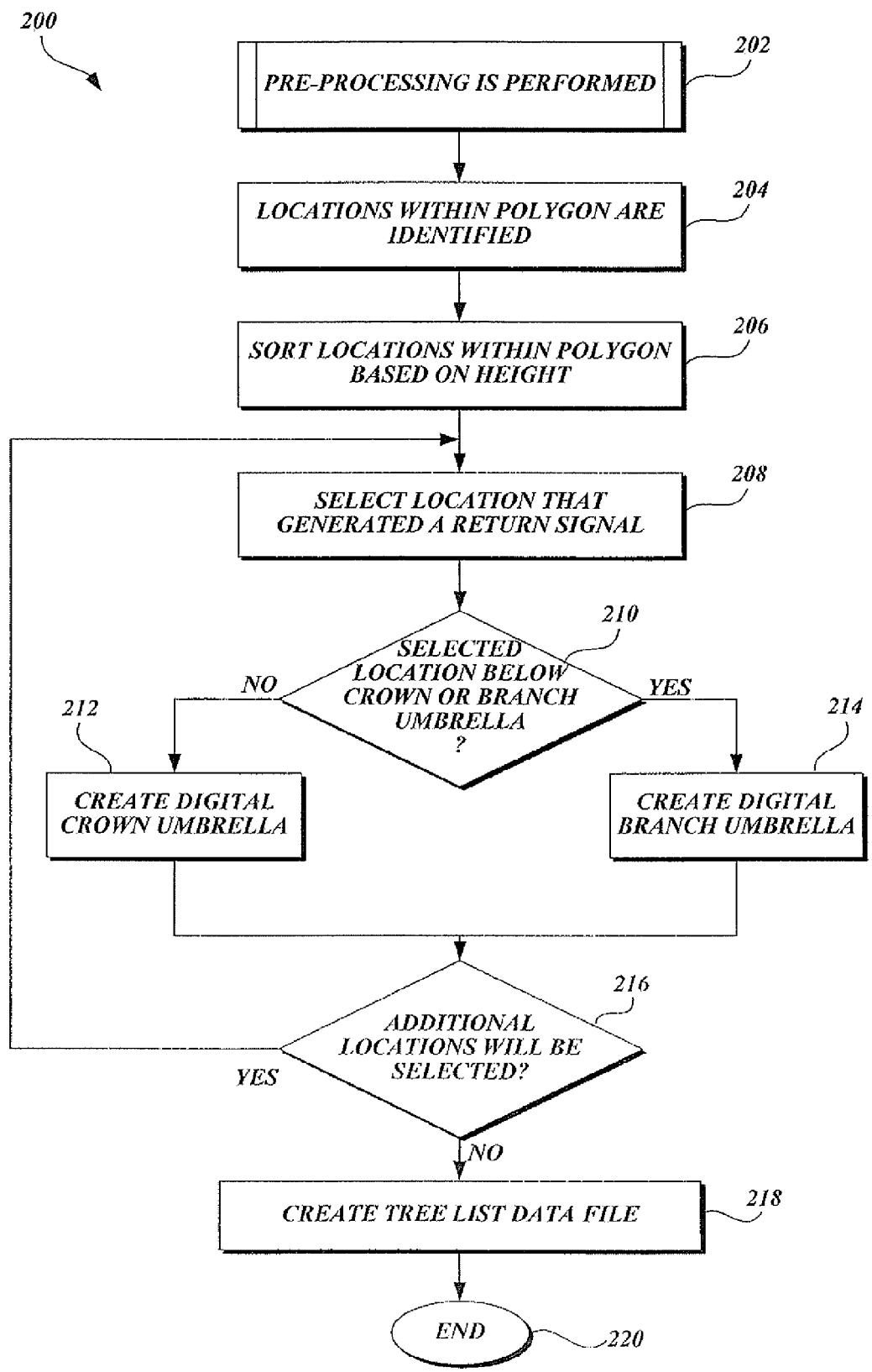
FIG. 2 depicts an exemplary crown identification routine for identifying the location and attributes of a crown associated with an item of vegetation in accordance with one embodiment of the present invention.

Now with reference to FIG. 2, an exemplary crown identification routine 200 that identifies the location of individual items of vegetation from raw LiDAR data will be described. As illustrated in FIG. 2, the crown identification routine 200 begins at block 202 where pre-processing is performed to translate raw LiDAR data into a standardized format that may be shared. For example, the pre-processing performed, at block 202, may translate raw LIDAR data into a format that adheres to the American Society of Photogrammetry and Remote Sensing ("ASPRS") .LAS binary file standard. In this regard, the ASPRS .LAS file format is a binary file format that is configured to store three-dimensional data points collected using LiDAR instrumentation. As described in further detail below, the .LAS file format includes well-defined records and fields that are readily accessible to software systems implemented by aspects of the present invention.

For illustrative purposes and by way of example only, a sample set 300 of LiDAR data that may be included in an ASPRS .LAS file is depicted in FIG. 3. In this exemplary embodiment, the sample set 300 of LiDAR data includes the records 302, 304, and 306 that each correspond to a laser pulse generated from LiDAR instrumentation. The records 302-306 depicted in FIG. 3 are organized into columns that include a return number column 308, a location column 310, an intensity column 312, and a ground flag column 314. As mentioned previously, each laser pulse generated from LiDAR instrumentation may be associated with a plurality of reflected return signals. Accordingly, the return number column 308 identifies return signals based on the chronological order in which the return signals were received. In the exemplary sample set 300 of data depicted in FIG. 3, the location column 310 identifies a three-tuple of coordinates (e.g., X, Y, and Z) of the location that generated the return signal. In accordance with one embodiment, the three-tuple of coordinates in the location column 310 adheres to the Universal Transverse Mercator ("UTM") coordinate system. In this regard, the Geographic Information System ("GIS") may be used to map raw LIDAR data to the UTM coordinate system. However, those skilled in the art and others will recognize that other types of mapping technology may be employed to identify these coordinate positions without departing from the scope of the claimed subject matter.

As further illustrated in FIG. 3, the sample set 300 of LiDAR data depicted in FIG. 3 includes an intensity column 312 that identifies the intensity of a corresponding return signal. In this regard, the intensity with which a return signal is reflected from a target location depends on a number of different factors. More specifically, the amount of surface area contacted by the LiDAR pulse affects the intensity value, as well as the physical characteristics of the subject matter that is contacted. For example, the more surface area that is contacted by the LiDAR pulse, the higher the intensity of the return signal. Also, the data provided in the ground flag column 314 indicates whether the particular return signal was identified as being the ground or floor below a vegetation canopy.

As illustrated in FIG. 3, the pre-processing performed at block 202 to generate the sample set 300 of data may include translating raw LiDAR data into a well-defined format. Moreover, in the embodiment depicted in FIG. 3, pre-processing is performed to identify return signals that were generated from contacting the ground or floor below the vegetation canopy. As described in further detail below, identifying return signals that are reflected from the ground or floor below a vegetation canopy may be used to identify the height of an item of vegetation.

With reference again to FIG. 2, at block 204, coordinate positions that are within the bounds of a selected polygon are identified. In one embodiment, aspects of the present invention sequentially process locations inside a predetermined geographic area (e.g., polygon) before other geographic areas are selected for processing. Accordingly, the geographic area occupied by a selected polygon is compared to the coordinate positions in a set of raw LiDAR data that generated return signals. In this regard, an intersection operation is performed for the purpose of identifying coordinate positions in a set of LiDAR data that are within the selected polygon. As described in further detail below, the locations of vegetation within the selected polygon are identified before other geographic areas are selected.

As further illustrated in FIG. 2, at block 206, coordinate positions that generated a return signal within the selected polygon are sorted based on their absolute height above sea level. In this regard, the coordinate position identified as being the highest is placed in the first position in the sorted data. Similarly, the lowest coordinate position is placed into the last position in the sorted data. However, since sorting locations based on their absolute height may be performed using techniques that are generally known in the art, further description of these techniques will not be described here.

At block 208, a location in the LiDAR data that generated a return signal is selected for processing. In one embodiment, aspects of the present invention sequentially select locations represented in the sorted data, at block 206, based on the location's absolute height. In this regard, the highest location in the sorted data is selected first with the lowest location being selected last.

At decision block 210, a determination is made regarding whether the location selected at block 208 is below a previously created digital crown umbrella. As described in further detail below, the invention generates a digital crown umbrella for each item of vegetation which represents an initial estimation of the area occupied by the vegetation. In this regard, if the selected location is below a previously created digital crown umbrella, then the result of the test performed at block 210 is "YES," and the crown identification routine 200 proceeds to block 214, described in further detail below. Conversely, if the location selected at block 208 is not under a previously created digital crown umbrella, the crown identification routine 200 determines that the result of the test performed at block 210 is "NO" and proceeds to block 212.

At block 212, a digital crown umbrella is created that represents an initial estimate of the area occupied by an individual item of vegetation. If block 212 is reached, the location selected at block 208 is identified as being the highest location in an individual item of vegetation. In this instance, a digital crown umbrella is created so that all other locations in the LiDAR data may be allocated to an individual item of vegetation. In this regard, the digital crown umbrella is an initial estimate of the area occupied by an item of vegetation. However, as described in further detail below, the area allocated to an individual item of vegetation may be modified as a result of processing other locations represented in the data.

In accordance with one embodiment, the size of the digital crown umbrella created at block 212 is estimated based on a set of known information. As described above with reference to FIG. 3, data obtained by aspects of the present invention include an indicator of which location represented in a LiDAR record is associated with the ground or floor below a vegetation canopy. Moreover, if block 212 is reached, the highest location that generated a return signal was identified. Thus, the height of an individual item of vegetation may be estimated by identifying the difference between the highest location of an item of vegetation that generated a return signal and the ground or floor below the vegetation canopy. Those skilled in the art others will recognize that a strong correlation exists between the height of vegetation and the size of the vegetation's crown. Thus, the size of the digital crown umbrella may be estimated based on the height of the vegetation, among other factors.

As further illustrated in FIG. 2, at block 214, a digital branch umbrella, which represents the area occupied by a branch, is created. If block 214 is reached, the location selected at block 208 is below a digital crown umbrella created during a previous iteration of the crown identification routine 200. Thus, the selected location that generated a return signal may represent a component of the vegetation, such as a branch, leaf, etc. In this instance, a digital branch umbrella is created that potentially extends the area allocated to an item of vegetation. As mentioned previously, a digital crown umbrella represents an initial estimate of the area occupied by an individual item of vegetation. However, additional processing of LiDAR data may indicate that an individual item of vegetation is larger than the initial estimate as represented in the digital crown umbrella. In this instance, the area allocated to an item of vegetation may be expanded to account for additional processing of the LiDAR data.

Figure 4:
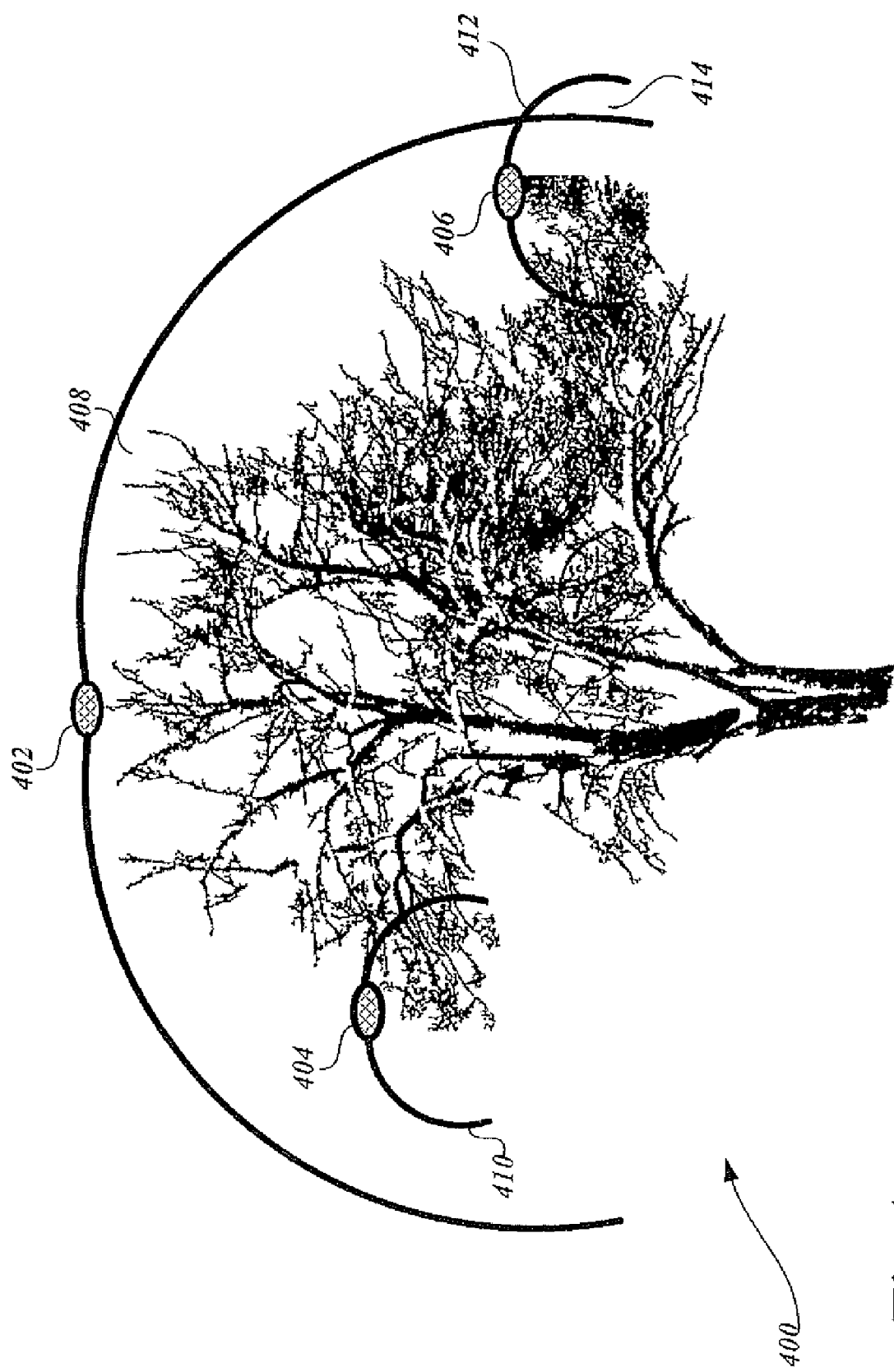
FIG. 4 depicts a digital representation of a tree that may be used to illustrate aspects of the present invention.

Now with reference to FIG. 4, the relationship between digital crown and branch umbrellas that may be used to represent an area occupied by an item of vegetation will be described. For illustrative purposes, a tree 400 is depicted in FIG. 4 with three locations 402, 404, and 406 that were contacted by a laser pulse. In this example, when location 402 is selected, the crown identification routine 200 generates the digital crown umbrella 408 to provide an initial estimate of the area occupied by the tree 400. Thereafter, when location 404 is selected, a determination is made that the location 404 is below the digital crown umbrella 408. In this instance, the crown identification routine 200 creates the digital branch umbrella 410. Similarly, when location 406 is selected, a determination is made that the location 406 is below the digital crown umbrella 408 and the crown identification routine 200 creates the digital branch umbrella 412. In this example, the digital branch umbrella 412 expands the area 414 that was initially allocated to the tree 400 by aspects of the present invention. In this way, a top-down hierarchical approach is used to initially estimate the area occupied by the tree 400 with modifications being performed to enlarge this area, if appropriate.

Again with reference to FIG. 2, a determination is made at decision block 216 regarding whether additional locations represented in the LiDAR data will be selected. As mentioned previously, aspects of the present invention sequentially select locations represented in LiDAR data that generated a return signal. Typically, all of the locations represented in a file of LiDAR data are selected and processed sequentially. Thus, when each record in a file of LIDAR data has been selected, the crown identification routine 200 proceeds to block 218, described in further detail below. Conversely, if additional locations will be selected, the crown identification routine 200 proceeds back to block 208, and blocks 208-216 repeat until all of the locations represented in the file have been selected.

As further illustrated in FIG. 2, at block 218, a tree list data file is created with data that describes attributes of individual items of vegetation. In this regard, and as described further below with reference to FIG. 5, aspects of the present invention identify certain attributes of each item of vegetation from which LiDAR data was collected. Significantly, the tree list data file may be used to update the contents of a database such as the inventory database 118 (FIG. 1) that tracks an inventory of raw materials available for harvest. Once the tree list data file is created, the crown identification routine 200 proceeds to block 220, where it terminates.

For illustrative purposes and by way of example only, a section 500 of a tree list data file created by aspects of the invention is depicted in FIG. 5. In this exemplary embodiment, the tree list data file includes a plurality of records 502-508 that each correspond to an item of vegetation. The records 502-508 are organized into columns that include an identifier column 510, a location column 512, a height column 514, a height to live crown ("HTLC") column 516, and a diameter at breast height ("DBH") column 518. In this regard, the identifier column 510 includes a unique numeric identifier for each item of vegetation identified by the crown identification routine 200. Similar to the description provided above with reference to FIG. 3, the location column 512 includes a three-tuple of coordinates that identifies the location of a corresponding item of vegetation. As mentioned previously, the height of an item of vegetation represented in the height column 514 may be calculated by identifying the difference between the highest location that generates a return signal with the ground or floor below a vegetation canopy.

As further illustrated in FIG. 5, the tree list data file 500 includes a HTLC column 516. Those skilled in the art and others will recognize that an item of vegetation such as a tree will include live branches and leaves on the upper part of the tree. The portion of the tree that includes live branches and leaves is typically referred to as a "live crown." However, a portion of the tree beginning from the base of the tree will not have live branches or leaves. The distance from the base of the tree to the live crown is identified in the HTLC column 516. Finally, the DBH column 518 includes a common metric known as diameter at breast height that may be estimated based on the height of the vegetation, height to live crown, among other factors.

As illustrated in FIG. 5, the processing performed at block 218 to create a tree list data file may include generating estimates about the attributes of vegetation from LIDAR data. For example, for each item of vegetation represented in the tree list data file, the height to the live crown and diameter at breast height are estimated using LiDAR data to generate the estimates.

Implementations of the present invention are not limited to the crown identification routine 200 depicted in FIG. 2. Other routines may include additional steps or eliminate steps shown in FIG. 2. Moreover, the steps depicted in FIG. 2 may also be performed in a different order than shown. For example, the creation of the tree list data file is described with reference to FIG. 2 as being performed separate from other steps of the routine 200. However, in practice, the tree list data file may be populated dynamically as the LiDAR data is being processed. Thus, the crown identification routine 200 depicted in FIG. 2 provides just one example of the manner in which an embodiment of the invention may be implemented.

Now with reference to FIG. 6, a species identification routine 600 for identifying the species of vegetation based on LIDAR data will be described. In one embodiment, the species identification routine 600 is configured to perform processing in conjunction with the crown identification routine 200 described above with reference to FIG. 2. In this regard, LiDAR data associated with individual items of vegetation is analyzed in order to obtain species information.

Figure 6:
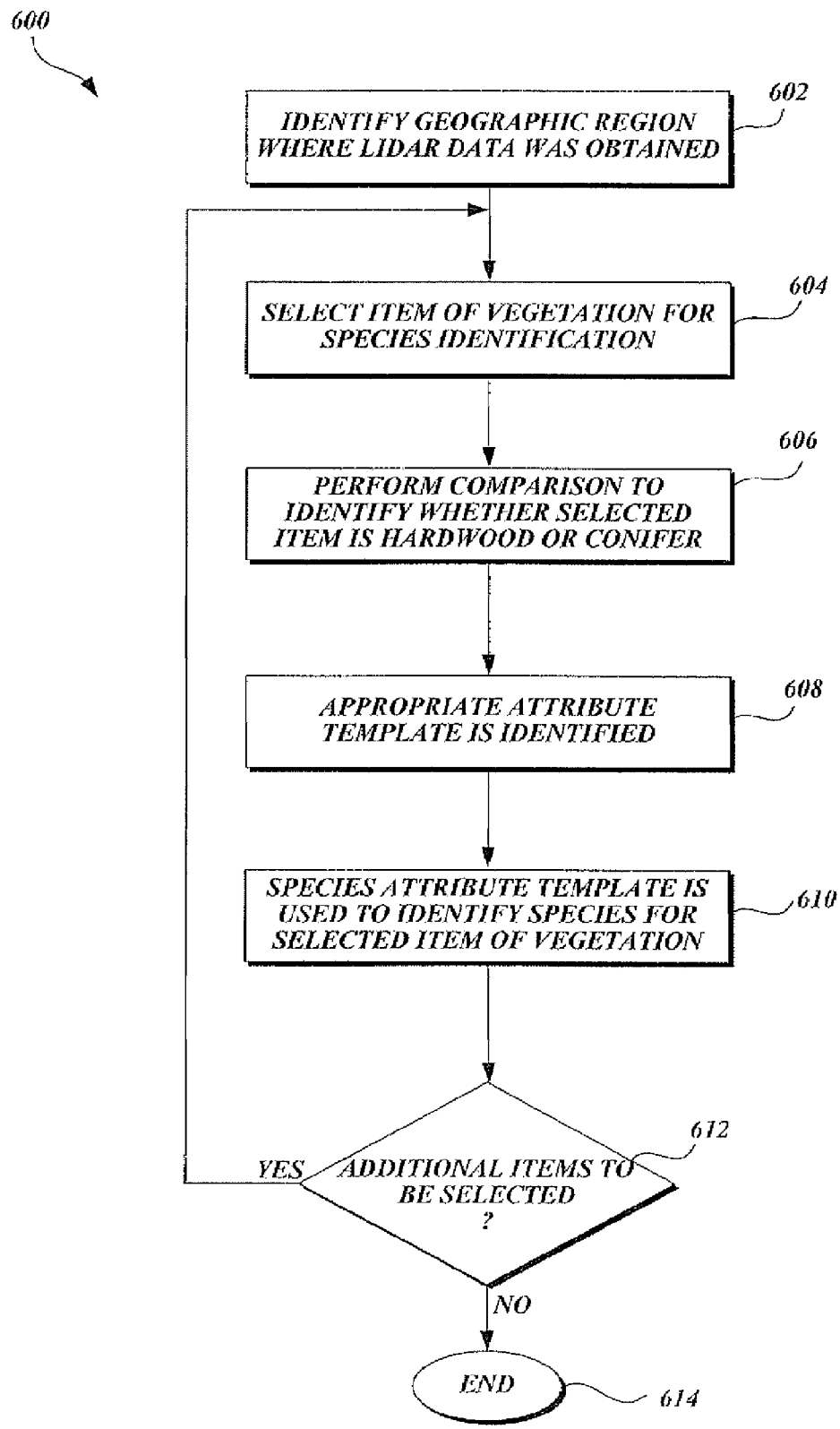
FIG. 6 depicts an exemplary species identification routine that identifies the species of an individual item of vegetation in accordance with another embodiment of the present invention.

As illustrated in FIG. 6, the species identification routine 600 begins at block 602, where a geographic region is identified where a set of LiDAR data was collected. As described in further detail below, and in accordance with one embodiment, aspects of the present invention use species attribute templates created from samples collected in a particular geographic region to identify species information. Thus, the species identification routine 600 identifies the geographic region from which LiDAR data was collected so that a comparison may be performed using an appropriate species attribute template. In this regard, the geographic region where a set of LiDAR data was collected is readily known and may be represented in the LiDAR data itself. For example, when the raw LiDAR data is collected, information may be included in a binary .LAS file to identify the geographic region where the LiDAR scanning is being performed.

At block 604, an individual item of vegetation such as a tree, bush, etc., is selected for species identification. In one embodiment, aspects of the present invention sequentially select individual items of vegetation and identify the species of the selected item. For example, the crown identification routine 200 described above with reference to FIG. 2 generates a tree list data file. Each record in the tree list data file contains location information and other data describing attributes of an individual item of vegetation. The species identification routine 600 may sequentially select records represented in the tree list data file and perform processing to obtain species information about an item of vegetation represented in a selected record.

As further illustrated in FIG. 6, at block 606, a comparison is performed to determine whether the item of vegetation selected a block 604 is from a hardwood or conifer species. As mentioned previously, aspects of the present invention may be used to identify the species of a selected item of vegetation. In this regard, those skilled in the art and others will recognize that hardwood species (Alder, Birch, Oak, etc.) have less foliage on average than conifer species (Douglas Fir, Noble Fir, etc.). As a result, hardwood species also have less surface area to reflect electromagnetic waves. Thus, the average intensity in return signals is largely a function of the amount of foliage on a tree and provides a highly reliable indicator as to whether a tree is from a hardwood or conifer species.

As mentioned previously with reference to FIG. 2, the intensity of reflected return signals is provided from the raw LiDAR data that is processed by aspects of the present invention. Thus, in one embodiment, a comparison is performed, at block 606, to determine whether the average intensity of the return signals generated from an item of vegetation is above or below a threshold that is used to differentiate between conifer and hardwood species. If the average intensity is below the pre-determined threshold, than the species identification routine 600 determines that the selected item is a hardwood species. Conversely, if the average intensity is above the predetermined threshold, the selected item is identified as a conifer species.

At block 608, an appropriate species attribute template used to make a species determination is identified. In one embodiment, sample sets of LiDAR data from different known species are collected in various geographic locations. From the sample data sets, attributes of the different species may be identified and represented in one or more species attribute templates. For example, calculations may be performed that quantify aspects of a tree's branching pattern, crown shape, amount of foliage, and the like. As described in further detail below, sample data that is represented in a species attribute template may serve as a "signature" to uniquely identify a species. In any event, at block 608, the appropriate species attribute template that represents data collected from known species is identified. In this regard, when block 608 is reached, a determination was previously made whether the selected item of vegetation is from a hardwood or conifer species. Moreover, the geographic region of the selected item of vegetation was previously identified. In accordance with one embodiment, attribute templates are created that are specific to particular geographic regions and categories of vegetation. For example, if the selected item is a conifer species from the western United States, a species attribute template created from sample conifers in the western United States is selected at block 608. By way of another example, if the selected vegetation is a hardwood species from the southern United States, a species attribute template created from sample hardwoods in the southern United States is selected at block 608.

As further illustrated in FIG. 6, at block 610, a comparison is performed to identify the species of the selected item of vegetation. More specifically, an attribute of the item of vegetation selected at block 604 is compared to the species attribute template identified at block 608. As described in further detail below, the comparison performed at block 610 is configured to identify a species represented in the species attribute template that maintains the same or similar attributes as the selected item of vegetation.

Figure 7:
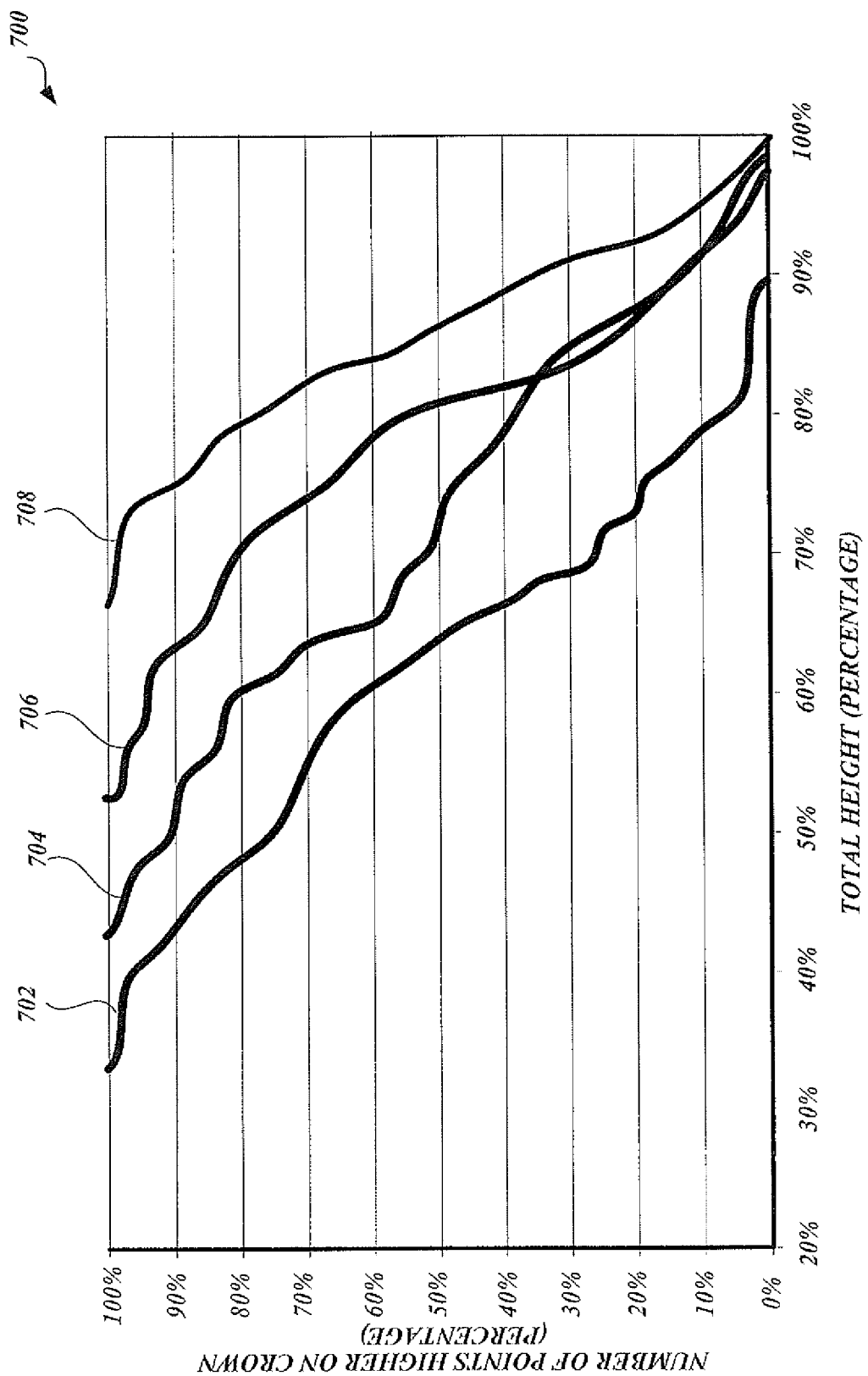
FIG. 7 depicts an exemplary species attribute template that may be employed to differentiate between species of vegetation in accordance with another embodiment of the present invention.

For illustrative purposes and by way of example only, an exemplary species attribute template 700 is depicted in FIG. 7. In this regard, the exemplary species attribute template 700 may be referenced, at block 610, to identify a species from which sample LiDAR data was obtained with the same or similar attribute as a selected item of vegetation. As illustrated in FIG. 7, the x-axis of the species attribute template 700 corresponds to the total height of an item of vegetation represented as a percentage. Moreover the y-axis corresponds to the number of LiDAR points generating return signals that are higher in the crown than a selected location. In this regard, FIG. 7 depicts the distributions 702, 704, 706, and 708 of sample LiDAR data collected from different species of vegetation.

The distributions 702-708 plot the number of LiDAR points generating return signals that are higher in the crown than a selected vertical location. In this regard, the species represented in distribution 702 reflects LiDAR return signals starting at lower vertical locations relative to the species represented in distributions 704-708. For example, as depicted in distribution 702, LiDAR return signals start being generated for this species at approximately 30% (thirty percent) of the samplers total height. For the species represented in distributions 704-708, LiDAR return signals start being generated at respectively higher vertical locations. The species attribute template indicates that branches and foliage that generate return signals tend to start at a lower location for the species represented in distribution 702. In this regard, the species attribute template 700 describes one crown attribute that may be used to differentiate between species. More specifically, the vertical locations where return signals are reflected relative to total height may be used to identify species information. However, those skilled in the art and others will recognize that the species attribute template 700 depicted in FIG. 7 provides an example of one data set that may be used by aspects of the present invention to identify species information for an item of vegetation.

Again with reference to FIG. 6, a determination is made at decision block 612 regarding whether additional items of vegetation will be selected for species identification. Typically, all of the items of vegetation represented in a tree list data file are selected and processed sequentially. Thus, when each record in a tree list data file data has been selected, the species identification routine 600 proceeds to block 614, where it terminates. Conversely, if additional items of vegetation will be selected for species identification, the species identification routine 600 proceeds back to block 604, and blocks 604-612 repeat until all of the items of vegetation represented in the tree list data file have been selected.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of processing LiDAR data to identify the species of an item of vegetation, the method comprising:
   identifying return signals that are associated with the item of vegetation;
   determining whether the average intensity of the return signals is above a threshold that differentiates between conifer and hardwood species;
   if the average intensity is at or above the threshold, using a microprocessor to determine that the item of vegetation is a conifer species and selecting a species attribute template that represents data collected from different conifer species;
   conversely, if the average intensity is below the threshold, using the microprocessor to determine that the item of vegetation is a hardwood species and selecting a species attribute template that represents data collected from different hardwood species;
   identifying a species from the selected species attribute template with a data attribute that most closely matches the item of vegetation.

2. The method as recited in claim 1, wherein identifying return signals that are associated with the item of vegetation includes determining whether the return signals are within an area allocated to a digital representation of the item of vegetation.

3. The method as recited in claim 1, wherein the species attribute template is generated from sample vegetation in a specified geographic region and wherein determining whether the average intensity of the return signals is above a threshold includes identifying data from a file that represents a geographic region where the sample vegetation is located.

4. The method as recited in claim 1, wherein the species attribute template compares the number of LiDAR points generating return signals that are higher in the crown than a selected vertical location for different species of vegetation.

5. The method as recited in claim 1, wherein the data represented in a species attribute template is at least one data element in a group consisting of data elements that describes branching pattern, crown shape, diameter, height, height to live crown, and amount of foliage for an item of vegetation.

6. The method as recited in claim 1, wherein identifying a species from the selected species attribute template includes performing a comparison between attributes of the item of vegetation with distributions that represent attributes of known species.

7. A computer system for identifying the species of an item of vegetation, the computer system comprising:
   a collection component operative to identify coordinate positions and intensity values where return signals were generated from the item of vegetation in response to being contacted with a LiDAR laser pulse;
   a crown identification component for identifying the location of the item of vegetation and determining whether the average of said intensity values of the return signals is above a threshold;
   a species identification component for identifying the species of the item of vegetation, wherein identifying the species of the item of vegetation, includes:
      selecting an appropriate species attribute template with data that describes one or more attributes of a known species; and
      using said computer system, comparing data collected from the item of vegetation with the selected species attribute template, wherein performing the comparison includes identifying a species with a data attribute that most closely matches the item of vegetation.

8. The computer system as recited in claim 7, wherein the crown identification component is further configured to:
   if the average of said intensity values is at or above the threshold, determine that the item of vegetation is a conifer species; and
   if the average of said intensity values is below the threshold, determine that the item of vegetation is a hardwood species.

9. The computer system as recited in claim 7, wherein selecting an appropriate species attribute template includes identifying the geographic region where the item of vegetation is located from data maintained in a data file.

10. The computer system as recited in claim 7, wherein species attribute templates are maintained that are specific to different geographic regions.

11. The computer system as recited in claim 7, wherein the data represented in a species attribute template describes a branching pattern for different species of vegetation.

12. The computer system as recited in claim 7, wherein the species attribute template compares the number of LiDAR points generating return signals that are higher in the crown than a selected vertical location for different species of vegetation.

13. A non-transitory computer-readable medium bearing computer-executable instructions that, when executed, carry out a method of processing LiDAR data to identify the species of an item of vegetation, the method comprising:
   identifying return signals that are associated with the item of vegetation;
   determining whether the average intensity of the return signals is above a threshold that differentiates between conifer and hardwood species;
   if the average intensity is at or above the threshold, determining that the item of vegetation is a conifer species and selecting a species attribute template that represents data collected from different conifer species;
   conversely, if the average intensity is below the threshold, determining that the item of vegetation is a hardwood species and selecting a species attribute template that represents data collected from different hardwood species;
   identifying a species from the selected species attribute template with a data attribute that most closely matches the item of vegetation.

14. The non-transitory computer readable-medium as recited in claim 13, wherein identifying return signals that are associated with the item of vegetation includes determining whether the return signals are within an area allocated to a digital representation of the item of vegetation.

15. The non-transitory computer readable-medium as recited in claim 13, wherein the species attribute template is generated from sample vegetation in specified geographic regions and wherein determining whether the average intensity of the return signals is above a threshold includes identifying data from a file that represents a geographic region where data was obtained.

16. The non-transitory computer readable-medium as recited in claim 13, wherein the species attribute template compares the number of LiDAR points generating return signals that are higher in the crown than a selected vertical location for different species of vegetation.

17. The non-transitory computer readable-medium as recited in claim 13, wherein the data represented in a species attribute template is at least one data element in a group consisting of data elements that describes a branching pattern, crown shape, diameter, height, height to live crown, and amount of foliage for the item of vegetation.

18. The non-transitory computer readable-medium as recited in claim 13, wherein identifying a species from the selected species attribute template includes performing a comparison between attributes of the item of vegetation with distributions that represent attributes of known species.

* * * * *